US012605009B2

(12) United States Patent
Zhou et al.

(10) Patent No.: US 12,605,009 B2
(45) Date of Patent: Apr. 21, 2026

(54) MOTORIZED CHUTE TRAP FOR A BEVERAGE BREWING SYSTEM

(71) Applicant: Haier US Appliance Solutions, Inc., Wilmington, DE (US)

(72) Inventors: Eddy Zhou, Shanghai (CN); Zhihua Liu, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 860 days.

(21) Appl. No.: 17/796,415

(22) PCT Filed: May 6, 2022

(86) PCT No.: PCT/CN2022/091150
§ 371 (c)(1),
(2) Date: Jul. 29, 2022

(87) PCT Pub. No.: WO2023/212911
PCT Pub. Date: Nov. 9, 2023

(65) Prior Publication Data
US 2024/0180354 A1      Jun. 6, 2024

(51) Int. Cl.
*A47J 31/44*        (2006.01)
*A47J 31/42*        (2006.01)
*A47J 31/52*        (2006.01)

(52) U.S. Cl.
CPC ........... *A47J 31/4403* (2013.01); *A47J 31/42* (2013.01); *A47J 31/52* (2013.01)

(58) Field of Classification Search
CPC ........ A47J 31/42; A47J 31/44; A47J 31/4403; A47J 31/4407
See application file for complete search history.

(56) References Cited

U.S. PATENT DOCUMENTS 8,481,098 B2 *  7/2013  Deolarte ............... A47J 31/401
                                            426/433
2009/0173236 A1  7/2009  Wang
(Continued)

FOREIGN PATENT DOCUMENTS

CN        101268914 A      9/2008
CN        102228366 A      11/2011
(Continued)

OTHER PUBLICATIONS

International Search Report Corresponding to Application No. PCT/CN2022/091150 on Jan. 18, 2023.

*Primary Examiner* — Thuyhang N Nguyen
(74) *Attorney, Agent, or Firm* — Dority & Manning, P.A.

(57)                ABSTRACT
A feeder system for a beverage dispenser includes a top plate for a basket, the top plate defining a chute aperture, a mounting plate positioned over the top plate, the mounting plate defining a mounting aperture, the mounting aperture being aligned with the chute aperture along the axial direction, a feeder module including a chute, the chute defining an outlet aligned with the mounting aperture along the axial direction, and a partition plate slidably coupled to the mounting plate, the partition plate movable between a first position and a second position. The partition plate includes a rack gear and an extension tab selectively disposed across the chute aperture to close the chute.

14 Claims, 7 Drawing Sheets

(56) References Cited

U.S. PATENT DOCUMENTS

| 2009/0188395 | A1 * | 7/2009 | Sala ..................... A47J 31/401 |
| | | | 99/289 R |
| 2010/0199849 | A1 | 8/2010 | Wu et al. |
| 2017/0112325 | A1 * | 4/2017 | Loannone ............... A47J 31/42 |
| 2017/0188747 | A1 * | 7/2017 | Leung .................... A47J 31/42 |
| 2020/0345169 | A1 | 11/2020 | Lai et al. |

FOREIGN PATENT DOCUMENTS

| CN | 102946772 | A | | 2/2013 | |
| CN | 107205570 | A | | 9/2017 | |
| CN | 110022735 | A | | 7/2019 | |
| CN | 113163975 | A | | 7/2021 | |
| CN | 213909795 | U | | 8/2021 | |
| CN | 113995306 | A | * | 2/2022 | .............. A47J 31/42 |
| JP | 2002183827 | A | * | 6/2002 | |
| JP | 4197837 | B2 | | 12/2008 | |
| TW | 201002256 | A | | 1/2010 | |

* cited by examiner

MOTORIZED CHUTE TRAP FOR A BEVERAGE BREWING SYSTEM

CROSS-REFERENCE TO RELATED APPLICATIONS

The present application is the National Stage Entry of and claims the benefit of priority under 35 U.S.C. § 371 to PCT Application Serial No. PCT/CN2022/091150 filed May 6, 2022 and entitled MOTORIZED CHUTE TRAP FOR A BEVERAGE BREWING SYSTEM, which is hereby incorporated by reference in its entirety for all purposes.

FIELD OF THE INVENTION

The present subject matter relates generally to beverage dispensers, and more particularly to chute traps for beverage dispensers.

BACKGROUND OF THE INVENTION

Beverage dispensers perform a range of operations related to preparing and dispensing various beverages on demand to users. Some such beverage dispensers incorporate certain preparation operations, resulting in a multifunctional, all-inclusive beverage machine. For one example, coffee machines include grinders for grinding coffee beans, a water tank for supplying water to the ground coffee, a first heating element to heat the water being supplied to the ground coffee, and a second heating element to provide heat to a container storing the beverage.

Such multifunctional beverage machines may operate automatically. For instance, upon receiving an input from a user to initiate a brewing operation, the beverage machine activates the grinder to grind supplied beans, subsequently supplying the ground beans to a basket. However, certain drawbacks exist to these machines. For instance, during a brewing process, steam is generated when adding heated water to a beverage powder. The steam may enter the grinder or a hopper, potentially causing damage to the machine or beverage powders supplied therein. Moreover, the beverage machine may fail to recognize that a chute through which the beverage powder is supplied is open before initiating a grinding process, resulting in a backup and potential damage to the beverage machine.

Accordingly, a beverage dispenser that obviates one or more of the above-mentioned drawbacks would be beneficial. In particular, a beverage brewing system that prevents unintentional brewing operations would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a feeder system for a beverage dispenser is provided. The feeder system may include a top plate for a basket, the top plate defining a chute aperture; a mounting plate positioned over the top plate, the mounting plate defining a mounting aperture, the mounting aperture being aligned with the chute aperture along the axial direction; a feeder module comprising a chute, the chute defining an outlet aligned with the mounting aperture along the axial direction; and a partition plate slidably coupled to the mounting plate, the partition plate movable between a first position and a second position.

The partition plate may include a rack gear and an extension tab selectively disposed across the chute aperture to close the chute.

In another exemplary aspect of the present disclosure, a beverage brewing system is provided. The beverage brewing system may include a housing; a component tower extending from the housing; a brewing basket module removably accommodated within the component tower; a hopper positioned within the component tower; a controller provided within the housing; and a feeder system provided within the component tower. The feeder system may include a top plate for a basket, the top plate defining a chute aperture; a mounting plate positioned over the top plate, the mounting plate defining a mounting aperture, the mounting aperture being aligned with the chute aperture along the vertical direction; a feeder module comprising a chute, the chute defining an outlet aligned with the mounting aperture along the vertical direction; and a partition plate slidably coupled to the mounting plate, the partition plate movable between a first position and a second position. The partition plate may include a rack gear and an extension tab selectively disposed across the chute aperture to close the chute.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
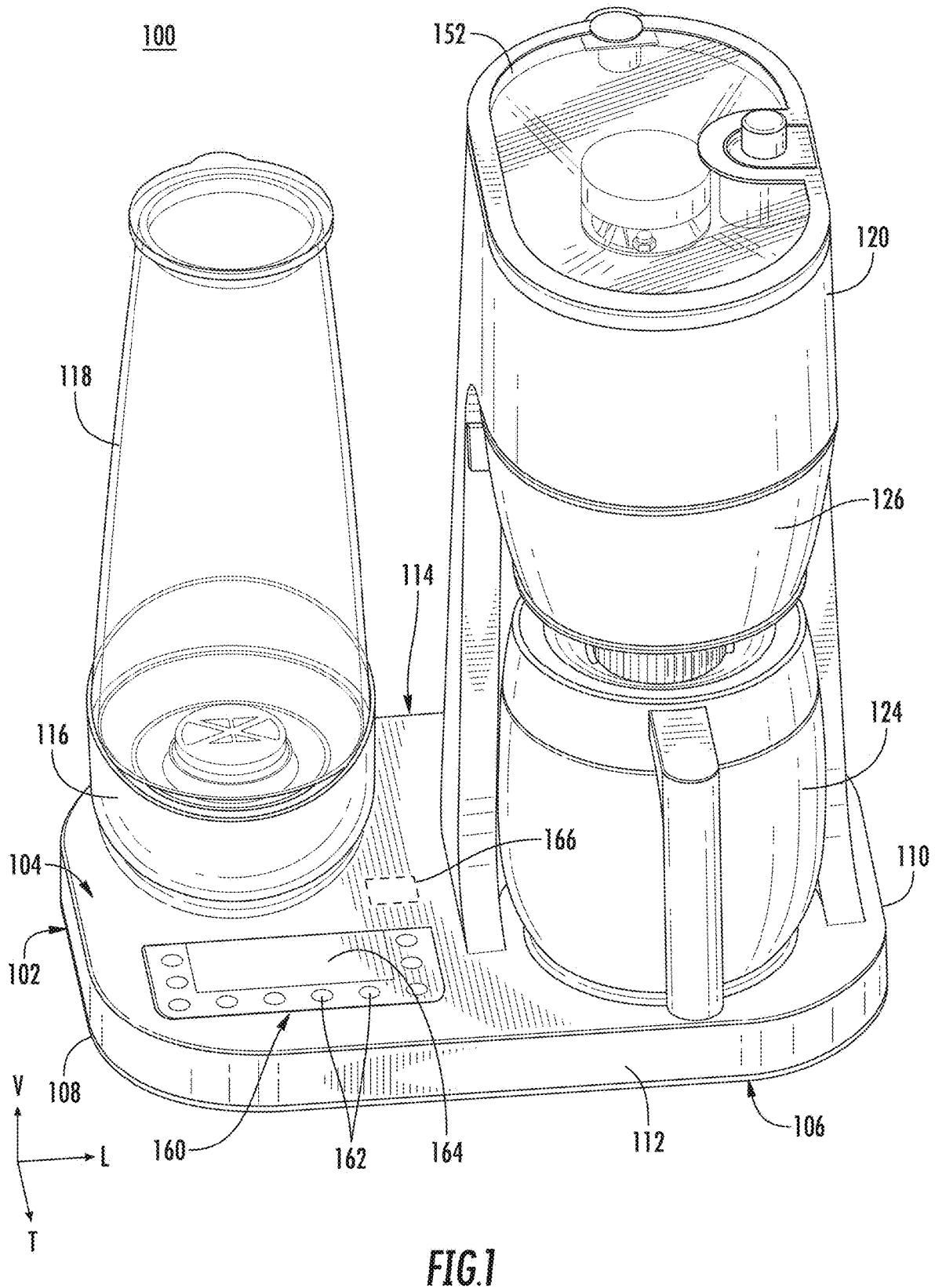
FIG. 1 provides a perspective view of a beverage brewing appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents. The terms "coupled," "fixed," "attached to," and the like refer to both direct coupling, fixing, or attaching, as well as indirect coupling, fixing, or attaching through one or more intermediate components or features, unless otherwise specified herein.

Figure 2:
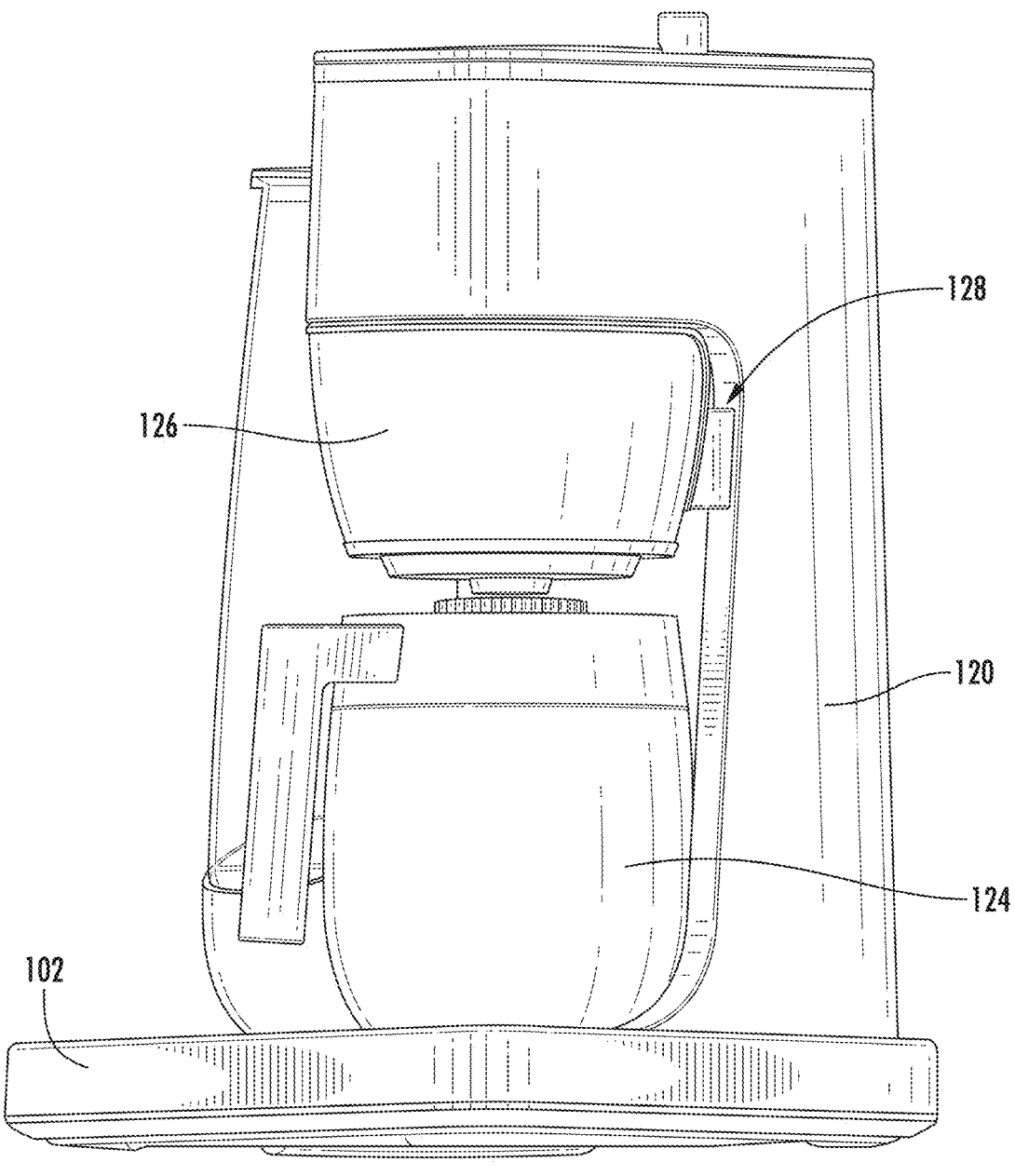
FIG. 2 provides a side perspective view of the exemplary beverage brewing appliance of FIG. 1.

Referring now to the figures, an exemplary appliance will be described in accordance with exemplary aspects of the present subject matter. Specifically, FIG. 1 provides a perspective view of an exemplary appliance (e.g., a beverage brewing system or beverage appliance) 100 and FIG. 2 provides a side view of appliance 100. As illustrated, appliance 100 generally defines a vertical direction V, a lateral direction L, and a transverse direction T, each of which is mutually perpendicular, such that an orthogonal coordinate system is generally defined.

According to exemplary embodiments, appliance 100 includes a cabinet or housing 102 that is generally configured for supporting various components of appliance 100 and which may also define one or more internal chambers or compartments of appliance 100. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that housing 102 does not necessarily require an enclosure and may simply include open structure supporting various elements of appliance 100. By contrast, housing 102 may enclose some or all portions of an interior of housing 102. It should be appreciated that housing 102 may have any suitable size, shape, and configuration while remaining within the scope of the present subject matter.

As illustrated, housing 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing appliance 100.

Appliance 100 may include a water tank mounting base 116. Water tank mounting base 116 may extend upward along the vertical direction V from top 104 of housing 102. For instance, water tank mounting base 116 may form a bowl shape into which a water tank 118 may be selectively inserted (or connected) to be used for beverage dispensing. Thus, housing 102 may include one or more passageways (such as tubes, pipes, or the like) in fluid connection with water tank mounting base 116. Water or liquid provided within water tank 118 may flow into the one or more passageways during a brewing or dispensing operation.

Appliance 100 may include a component tower 120. Component tower 120 may extend along the vertical direction V from top 104 of housing 102. Accordingly, component tower 120 may be provided adjacent to water tank mounting base 116. Component tower 120 may define a receiving space 122 for, e.g., a carafe 124. The receiving space 122 may form an alcove into which a beverage container (such as carafe 124) may be positioned to receive a liquid. According to at least one embodiment, a coffee carafe 124 is selectively positioned within receiving space 122 for accepting brewed coffee. Accordingly, receiving space 122 may be formed in part by top 104 of housing 102. Accordingly, a heating element (not shown) may be provided within housing 102. The heating element may thus be at least partially provided within receiving space 122. (e.g., at a bottom portion thereof to support or otherwise direct heat to carafe 124).

Referring still to FIG. 1, appliance 100 may include a control panel 160 that may represent a general-purpose Input/Output ("GPIO") device or functional block for appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, appliance 100 may include a display 164, such as a digital or analog display device generally configured to provide visual feedback regarding the operation of appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of appliance 100. For example, signals generated by controller 166 may operate appliance 100, including any or all system components, subsystems, or interconnected devices, in response to the position of user input devices 162 and other control commands. Control panel 160 and other components of appliance 100 may be in communication with controller 166 via, for example, one or more signal lines or shared communication busses. In this manner, Input/Output ("I/O") signals may be routed between controller 166 and various operational components of appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flipflops, AND/OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 166 may be operable to execute programming instructions or micro-control code associated with an operating cycle of appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods as disclosed herein. For example, in some embodiments, methods disclosed herein may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Component tower 120 may include a brewing basket mounting bracket 126. Brewing basket mounting bracket 126 may be rotatably attached to component tower 120. For instance, brewing basket mounting bracket 126 may rotate with respect to component tower 120 along an axis of rotation 128 defined along the vertical direction V. As shown primarily in FIG. 2, axis of rotation 128 may be provided along a lateral edge of component tower 120 (e.g., near second side 110). Brewing basket mounting bracket 126 may be rotatable between a closed position (e.g., accepted within component tower 120) and an open position (e.g., rotated away from component tower 120). Thus, brewing basket mounting bracket 126 may be selectively rotated away from component tower 120 to allow access thereto.

Moreover, brewing basket mounting bracket 126 may define a module receiving space 130 therein. Accordingly, at least a portion of brewing basket mounting bracket 126 (and module receiving space 130) is received within component tower 120 in the closed position.

Figure 3:
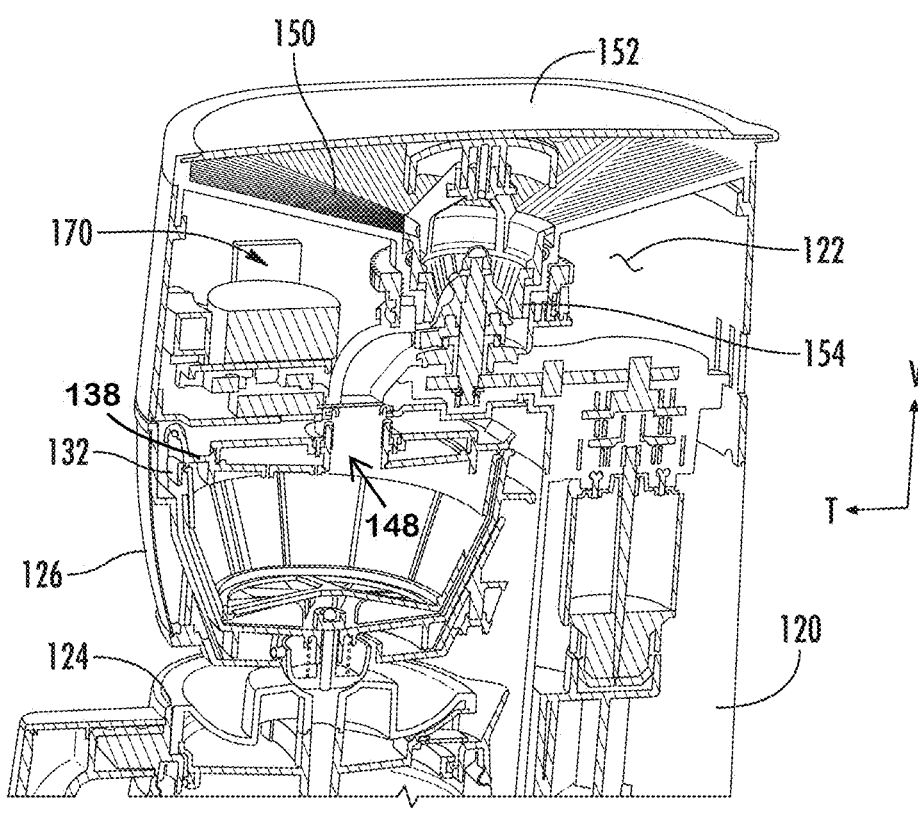
FIG. 3 provides a side cross-section view of a brewing module according to exemplary embodiments of the present disclosure.

Referring briefly to FIG. 3, brewing basket module 132 may include a basket 134 defining a material receiving space 136. Brewing materials may be selectively supplied within material receiving space 136, such as filters (e.g., coffee filters), coffee grounds, tea leaves, or the like. Basket 134 may have a generally cylindrical shape (or a truncated conical shape), having a central axis defined along the vertical direction V. Other shapes may be incorporated for basket 134, however, and the disclosure is not limited to the examples given herein. For example, basket 134 is shaped complementary to brewing basket mounting bracket 126. Accordingly, brewing basket module 132 may fit easily and securely within brewing basket mounting bracket 126.

Brewing basket module 132 may include a lid 138. Lid 138 may be movably (e.g., rotatably) coupled to basket 134 to move between an open position and a closed position. For instance, lid 138 may rotate about an axis of rotation 140 defined along a horizontal direction (e.g., the lateral direction L or the transverse direction T, or an angle therebetween). Lid 138 may selectively cover material receiving space 136 (e.g., in the closed position).

Lid 138 may have a plurality of apertures defined therein. For instance, a liquid aperture 146 and a powder aperture (or chute aperture) 148 may be formed in lid 138. Liquid aperture 146 and chute aperture 148 may be spaced apart from each other (e.g., about lateral direction L or transverse direction T). Liquid and chute apertures 146 and 148 may be formed through lid 138 along the vertical direction V (e.g., when lid 138 is in the closed position). Thus, a plurality of access points may be defined in lid 138. For instance, liquid from water tank 118 may be delivered to basket 134 via liquid aperture 146. Additionally or alternatively, brewing materials (e.g., coffee grounds) may be delivered to basket 134 via chute aperture 148.

Appliance 100 may include a hopper 150. Hopper 150 may be positioned within component tower 120. For instance, hopper 150 may be positioned above brewing basket mounting bracket 126. Hopper 120 may provide a receptacle for certain raw brewing materials (e.g., whole coffee beans). Accordingly, a hopper top 152 may be provided over hopper 150. Hopper 150 may include one or more inclined surfaces 154 creating a funnel toward a center thereof. Accordingly, the raw brewing materials supplied to hopper 150 may be funneled toward a center of hopper 150.

Appliance 100 may include a grinding mechanism 154. Grinding mechanism 154 may be positioned within component tower 120. For instance, grinding mechanism 154 may be positioned between hopper 150 and brewing basket mounting bracket 126. Grinding mechanism 154 may include one or more gears configured to perform a grinding or crushing action on materials supplied thereto. For example, coffee beans placed into hopper 150 are fed to grinding mechanism 154, which in turn grind the coffee beans into a powder (e.g., coffee grounds). The coffee grounds may then be supplied to brewing basket module 132 accommodated within brewing basket mounting bracket 126.

Figure 4:
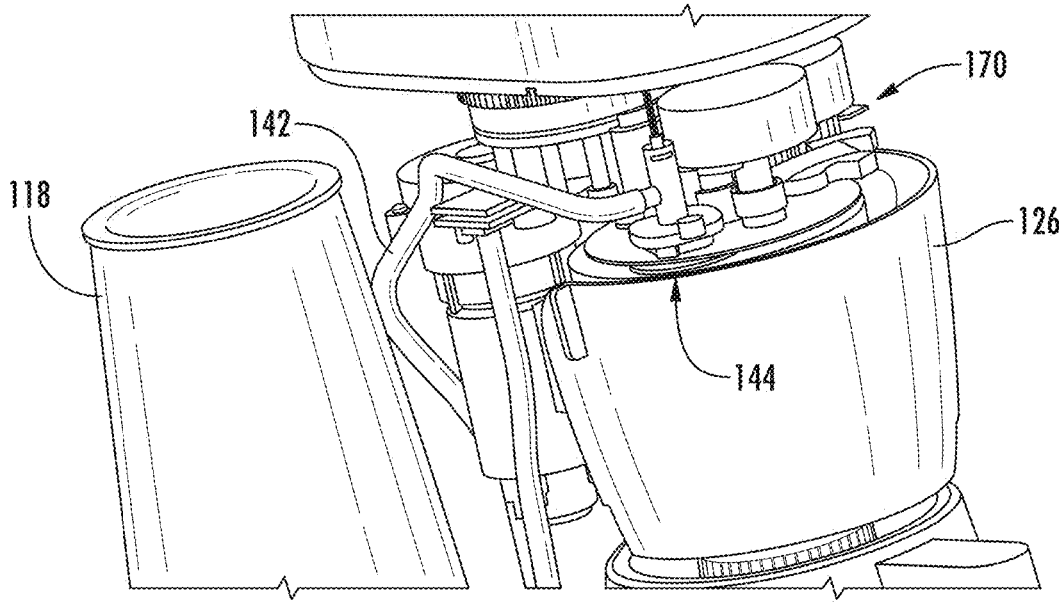
FIG. 4 provides a perspective view of interior components of the beverage brewing appliance of FIG. 1.

Referring briefly to FIG. 4, appliance 100 may include a liquid supply conduit 142. Liquid supply conduit 142 may provide a liquid pathway for liquid (e.g., water) to flow from water tank 118 to brewing basket module 132. Liquid supply conduit 142 may include one or more tubes, pipes, or other liquid passageways. Liquid supply conduit 142 may include a heater (not shown) therein to supply heat to the liquid flowing therethrough. As seen in FIG. 4, liquid supply conduit 142 may define an outlet 144. Outlet 144 may be located at or near lid 138 of brewing basket module 132 (e.g., proximate liquid aperture 146). Thus, liquid may be selectively supplied to basket 134 by exiting liquid supply conduit 142 from outlet 144. According to some embodiments, a valve or pump (not shown) is provided on liquid supply conduit 142. The valve or pump may be an electronically controlled valve (or electronically controlled pump) and may be operably coupled with controller 166. According to an input from a user (including a delayed or scheduled input), controller 166 may activate the valve or pump to supply liquid to basket 134.

Referring now to FIGS. 5 through 10, appliance 100 may include a beverage feeder system 170. Beverage feeder system 170 may be provided within component tower 120 (e.g., above brewing basket module 132 along the vertical direction V). Thus, beverage feeder system 170 may assist in delivering a beverage powder (e.g., ground coffee beans) into basket 134. For instance, beverage feeder system 170 may provide or define a pathway for the beverage powder between grinding mechanism 154 and basket 134. Hereinafter, beverage feeder system 170 may define an axial direction A, a radial direction R, and a circumferential direction C. According to this description, axial direction A may correspond with vertical direction V (e.g., in parallel to). Accordingly, the coordinate systems may be used interchangeably throughout the description.

Figures 5, 6:
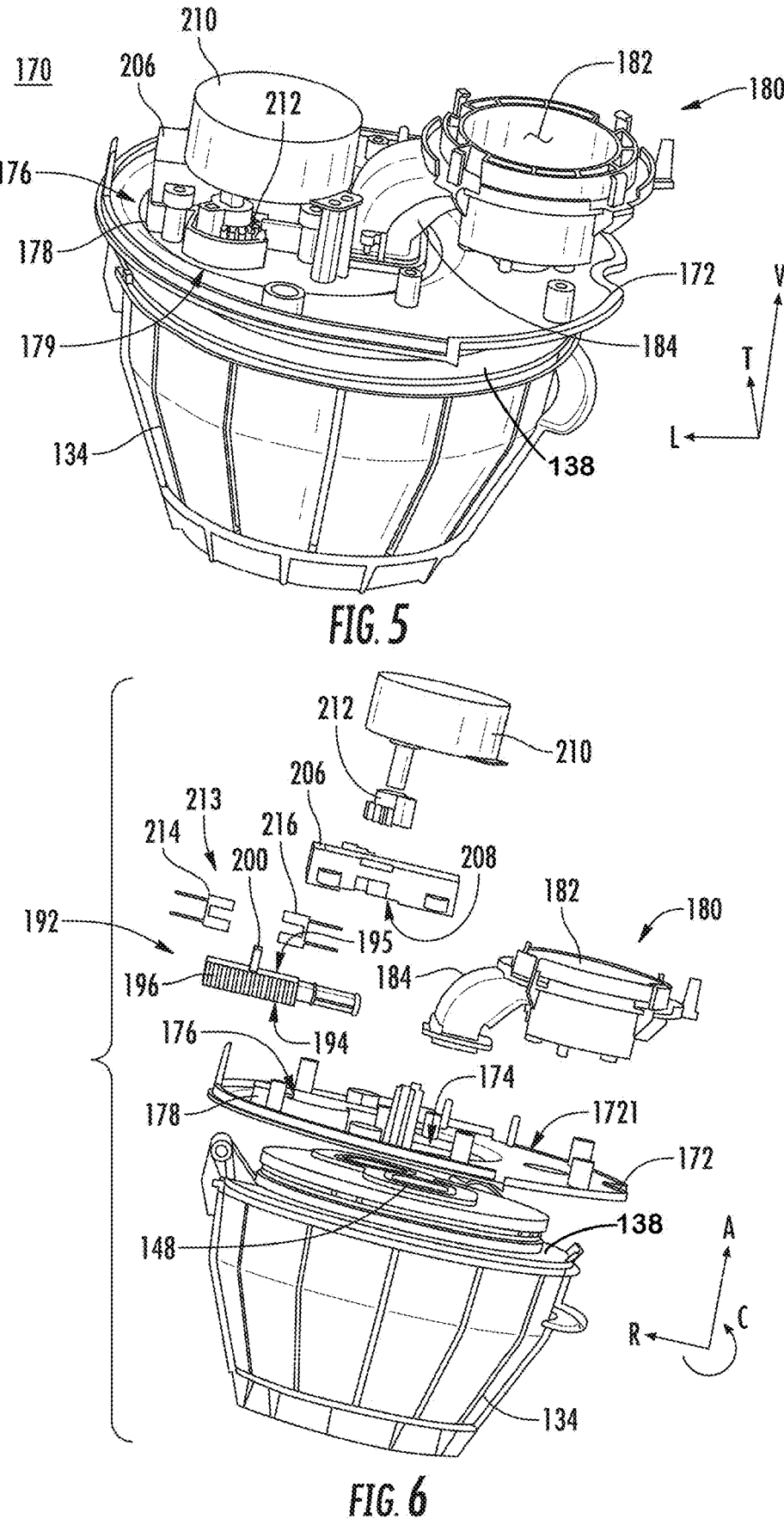
FIG. 5 provides a perspective view of a beverage feeder system according to exemplary embodiments of the present disclosure.
FIG. 6 provides an exploded view of the exemplary beverage feeder system of FIG. 5.

Beverage feeder system 170 may include a mounting plate 172. Mounting plate 172 may be positioned within component tower 120. As seen in FIG. 5, mounting plate 172 may be located above brewing basket module 132 (e.g., along the vertical direction V or axial direction A). Mounting plate 172 may be sized or shaped commensurate with a top of brewing basket module 132. For one example, as shown in the figures, mounting plate 172 may be predominantly circular (e.g., forming a circumference along the circumferential direction C). Mounting plate 172 may be fixed within component tower 120. In detail, mounting plate 172 may be attached to an interior wall or surface of component tower 120. Thus, brewing basket module 132 may move relative to mounting plate 172.

Mounting plate 172 may be formed from a rigid material (e.g., such as a solid polymer, a composite, a metal compound, or the like). Thus, one or more additional items or features may be attached to mounting plate 172, as will be described below. Additionally or alternatively, mounting plate 172 may define one or more apertures. For instance, mounting plate 172 may define a mounting aperture 174. Mounting aperture 174 may be aligned with chute aperture 148 (e.g., along the vertical direction V or axial direction A). In detail, when brewing basket module 132 is in an installed position (or inserted position), mounting aperture 174 may be aligned with chute aperture 148 along the vertical direction V. Thus, as will be explained below, the beverage powder may be transferred from, e.g., grinding mechanism 154 into basket 134 seamlessly. Further, it should be noted that additional apertures may be formed into mounting plate 172, such as a liquid or water aperture, one or more fastener apertures, one or more electrical apertures, or the like.

Mounting plate 172 may define a partition groove 176. Partition groove 176 may be formed on or in, e.g., a top surface 1721 of mounting plate 172. Partition groove 176 may be shaped so as to accept a partition plate (described below) therein. For instance, partition groove 176 may form a substantially rectangular shape (e.g., as measured along the lateral direction L and transverse direction T). Partition groove 176 may be defined by one or more sidewalls 178. Each of the one or more sidewalls 178 may protrude upward (e.g., along the vertical direction V or axial direction A) from top surface 172I of mounting plate 172. Additionally or alternatively, partition groove 176 may be provided adjacent to mounting aperture 174 (e.g., along the lateral direction L). In detail, partition groove 176 may abut mounting aperture 174. As will be described below, the partition plate may be movable within partition groove 176 so as to selectively cover or block mounting aperture 174.

Mounting plate 172 may define a gear groove 179. Gear groove 179 may be formed on or in, e.g., top surface 172I of mounting plate 172. Gear groove 179 may be shaped so as to accept a gear (described below) therein. For instance, gear groove 179 may form a substantially circular shape (e.g., about the circumferential direction C). Gear groove 179 may be provided adjacent to partition groove 176. In detail, gear groove 179 may abut partition groove 176 along the transverse direction T. Thus, as will be explained below, the gear may interact with the partition plate within partition groove 176 (e.g., according to intermeshed gear teeth).

Beverage feeder system 170 may include a feeder module 180. Feeder module 180 may be accommodated within component tower 120. Feeder module 180 may be selectively coupled to top surface 172I of mounting plate 172. Feeder module 180 may define a grinding mechanism receiving space (GMRS) 182. GMRS 182 may be shaped to as to receive one or more components of grinding mechanism 154 therein. As shown in the figures, GMRS 182 may be substantially cylindrical, having an axis defined along the axial direction A (or vertical direction V). Accordingly, GMRS 182 may provide a receiving space for a grinding gear, for example. Additionally or alternatively, GMRS 182 may be positioned under hopper 150 (e.g., along the vertical direction V). Accordingly, beverage supplies (e.g., coffee beans) supplied to hopper 150 may fall into GMRS 182 to be ground into the beverage powder.

Figure 8:
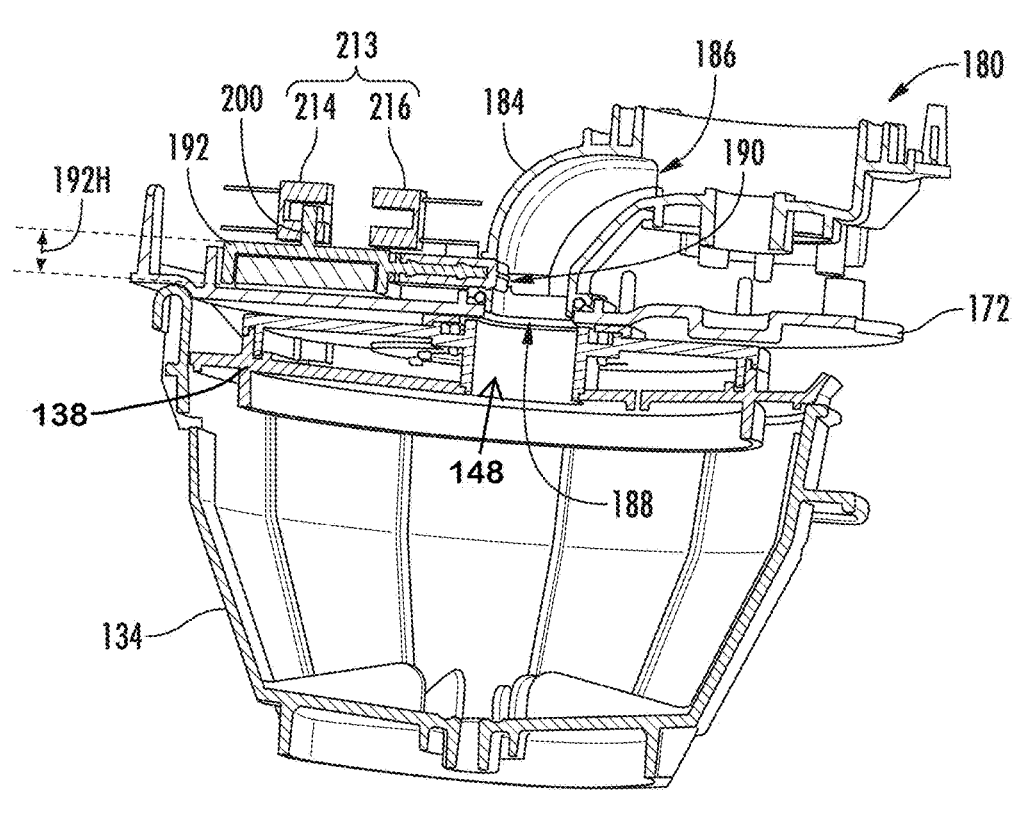
FIG. 8 provides a cross-section view of the components of the exemplary beverage feeder system of FIG. 5 in the open position.

Feeder module 180 may define a chute 184. Chute (or supply chute) 184 may be fluidly connected with GMRS 182. For instance, the beverage powder formed within GMRS 182 may be then supplied to chute 184. As seen in FIG. 8, for example, chute 184 may define an inlet portion 186 connected with GMRS 182 and an outlet portion 188 connected with mounting plate 172. In detail, outlet portion (or outlet) 188 may be aligned with mounting aperture 174 along the vertical direction V (or axial direction A). Outlet portion 188 may thus be attached to top surface 172I of mounting plate 172 at mounting aperture 174. Inlet portion 186 may be positioned higher than outlet portion 188 (e.g., along the vertical direction V). Accordingly, the beverage powder may flow downward (along the vertical direction V) from inlet portion 186 to outlet portion 188.

Chute 184 may have a partition aperture 190 formed therein. In detail, partition aperture 190 may be formed along the radial direction R (or along the lateral direction L). Partition aperture 190 may be formed at or near outlet portion 188 of chute 184. For instance, partition aperture 190 may be located immediately above outlet portion 188 along the vertical direction V. Thus, partition aperture 190 may be formed through a sidewall of chute 184. Moreover, partition aperture 190 may be elongated (e.g., along the transverse direction T). In detail, partition aperture 190 may be shaped commensurate with the partition plate (described below). According to at least one embodiment, partition aperture 190 is substantially rectangular in shape (e.g., as defined along the radial direction R).

Additionally or alternatively, partition aperture 190 may be formed proximate partition groove 176. For instance, partition aperture 190 may allow fluid communication between partition groove 176 and an interior of chute 184. As will be explained below, the partition plate may selectively penetrate partition aperture 190 to close or block chute 184 from fluidly communicating with powder aperture 148. Accordingly, partition aperture 190 selectively accepts the partition plate therein.

Beverage feeder system 170 may include a partition plate 192. Partition plate 192 may be selectively received within partition groove 176. For instance, partition plate 192 may be shaped commensurate with partition groove 176. In detail, partition plate 192 may be substantially rectangular. Partition plate 192 may define a contact surface 194. Contact surface 194 may be in sliding contact with top surface 172I of mounting plate 172. Accordingly, partition plate 192 may lay relatively flat against top surface 172I of mounting plate 172. Partition plate 192 may define a height 192H along the vertical direction V, a length 192L along the lateral direction, and a width 192W along the transverse direction T. According to at least some embodiments, 192L>192W>192H.

Partition plate 192 may include a rack gear 196 and an extension tab 198. Rack gear 196 may be provided on a lateral side of partition plate 192. For instance, rack gear 196 may include a plurality of linear gear teeth protruding along, e.g., the transverse direction T. Rack gear 196 may thus be exposed (e.g., along the transverse direction T) through partition groove 176. For one example, rack gear 196 is exposed toward gear groove 179 (e.g., along the transverse direction T). Extension tab 198 may extend from rack gear 196 (e.g., along the lateral direction L). Extension tab 198 may be a rectangular shaped tab shaped commensurate with partition aperture 190 in chute 184. Accordingly, extension tab 198 may be selectively received within partition aperture 190.

Partition plate 192 may be movable (e.g., linearly slidable) within partition groove 176. For instance, partition plate 192 may be movable between a first position and a second position. According to at least some embodiments, the first position relates to an open position of chute 184. For instance, partition plate 192 is in the first position when extension tab 198 is fully withdrawn from partition aperture 190. Accordingly, a fluid passageway between chute 184 and powder aperture 148 in lid 138 is open, allowing the beverage powder to flow from chute 184 into basket 134. Likewise, partition plate 192 is in the second position when extension tab 198 is fully inserted into partition aperture 190. Accordingly, the fluid passageway between chute 184 and powder aperture 148 is closed. Advantageously, steam or beverage byproducts are restricted from flowing up through chute 184 and into grinding mechanism 154 or hopper 150 when partition plate 192 is in the second position.

Partition plate 192 may include a pin 200. Pin 200 may protrude from partition plate 192 along the vertical direction V (or axial direction A). For instance, pin 200 may protrude from an upper face 195 of partition plate 192. Pin 200 may be provided proximate rack gear 196. In detail, pin 200 may be located a predetermined distance (e.g., along the lateral direction L) from extension tab 198. Advantageously, pin 200 may not interfere with chute 184 when partition plate 192 moves between the first position and the second position. Accordingly, pin 200 may be spaced apart (e.g., along the transverse direction T) from rack gear 196.

Pin 200 may have any suitable shape (e.g., cross-section). For one example, pin 200 has a squared cross-section (e.g., in a plane defined along the radial direction R). Additionally or alternatively, pin 200 may include a first segment 202. First segment 202 may extend predominantly along the vertical direction V (or axial direction A). For instance, first segment 202 may extend to a length that is about equal to height 192H of partition plate 192. Pin 200 may selectively interact with a pair of switches (described below).

Pin 200 may include a second segment 204. Second segment 204 may extend from a distal end of first segment 202 (e.g., along the transverse direction T). For instance, second segment 204 may extend predominantly parallel to upper face 195 of partition plate 192. According to some embodiments, second segment 204 extends to a length approximately equal to the length of first segment 202. In detail, second segment 204 may have a length that is about equal to height 192H of partition plate 192.

Beverage feeder system 170 may include a motor bracket 206. Motor bracket 206 may be connected to mounting plate 172. In detail, motor bracket 206 may be attached to mounting plate 172 via any suitable means. Generally, motor bracket 206 may be attached to mounting plate 172 via fasteners, adhesive, magnets, clips, or the like. According to at least one example, motor bracket 206 is fixed to mounting plate 172 via a plurality of fasteners. Motor bracket 206 may be positioned over partition groove 176 (e.g., along the vertical direction V). For instance, motor bracket 206 may cover partition groove 176 and partition plate 192 along the vertical direction V. Motor bracket 206 may define a receiving space 208 therein. As will be explained below, receiving space 208 may accommodate one or more sensors or switches therein.

Beverage feeder system 170 may include a motor 210. Motor 210 may be attached to motor bracket 206. For instance, motor 210 may be attached to a top surface of motor bracket 206 (e.g., opposite receiving space 208). As used herein, "motor" may refer to any suitable drive motor and/or transmission assembly. For example, motor 210 may include a brushless DC electric motor, a stepper motor, or any other suitable type or configuration of motor. For example, motor 210 may include an AC motor, an induction motor, a permanent magnet synchronous motor, or any other suitable type of AC motor. In addition, motor 210 may include any suitable transmission assemblies, clutch mechanisms, or other components. According to an exemplary embodiment, motor 210 may be operably coupled to controller 166, which is programmed to rotate motor 210 as described herein.

Beverage feeder system 170 may include a driving gear 212. Driving gear 212 may be accommodated within gear groove 179 on top surface 1721 of mounting plate 172. Accordingly, driving gear 212 may be a circular toothed gear capable of rotation (e.g., about the circumferential direction C) within gear groove 179. During use, driving gear 212 may receive a rotational input from motor 210. Consequently, driving gear 212 may rotate according to the rotational input from motor 210.

Figure 7:
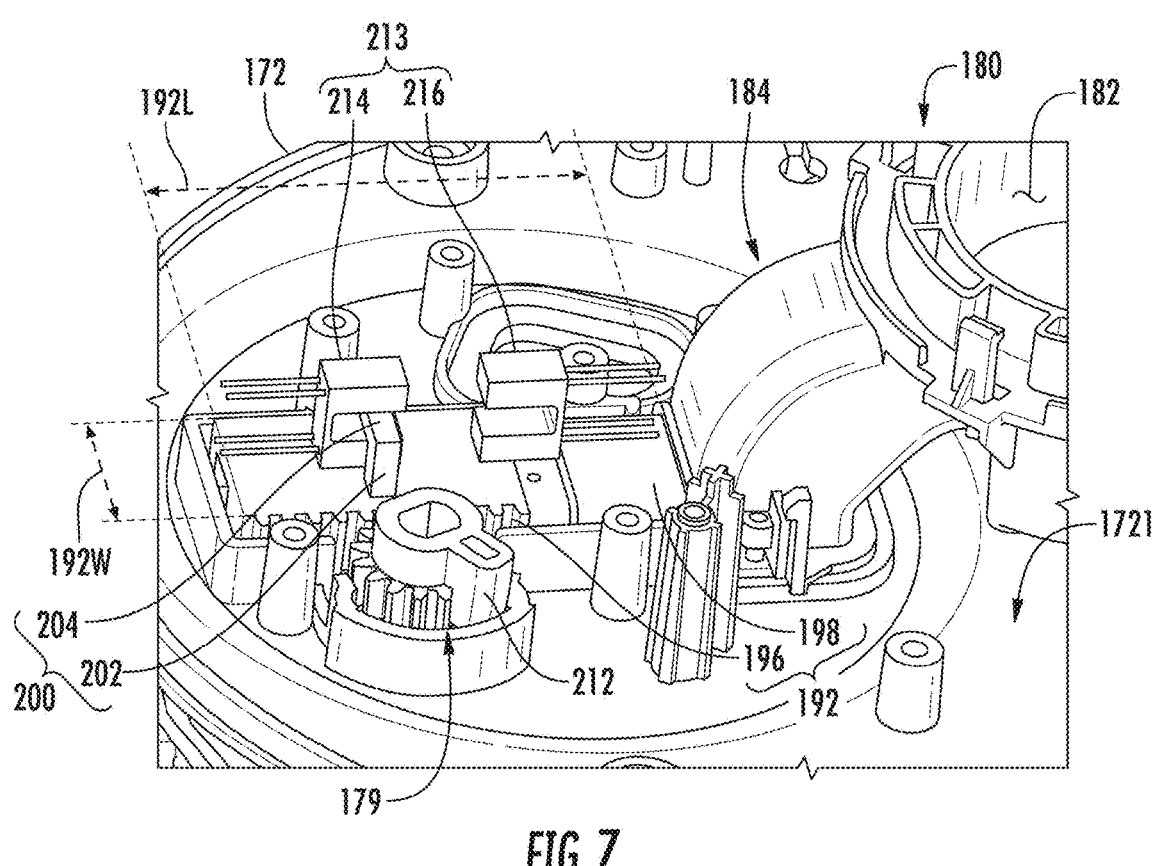
FIG. 7 provides a close-up perspective view of components of the exemplary beverage feeder system of FIG. 5 in an open position.
Figure 9:
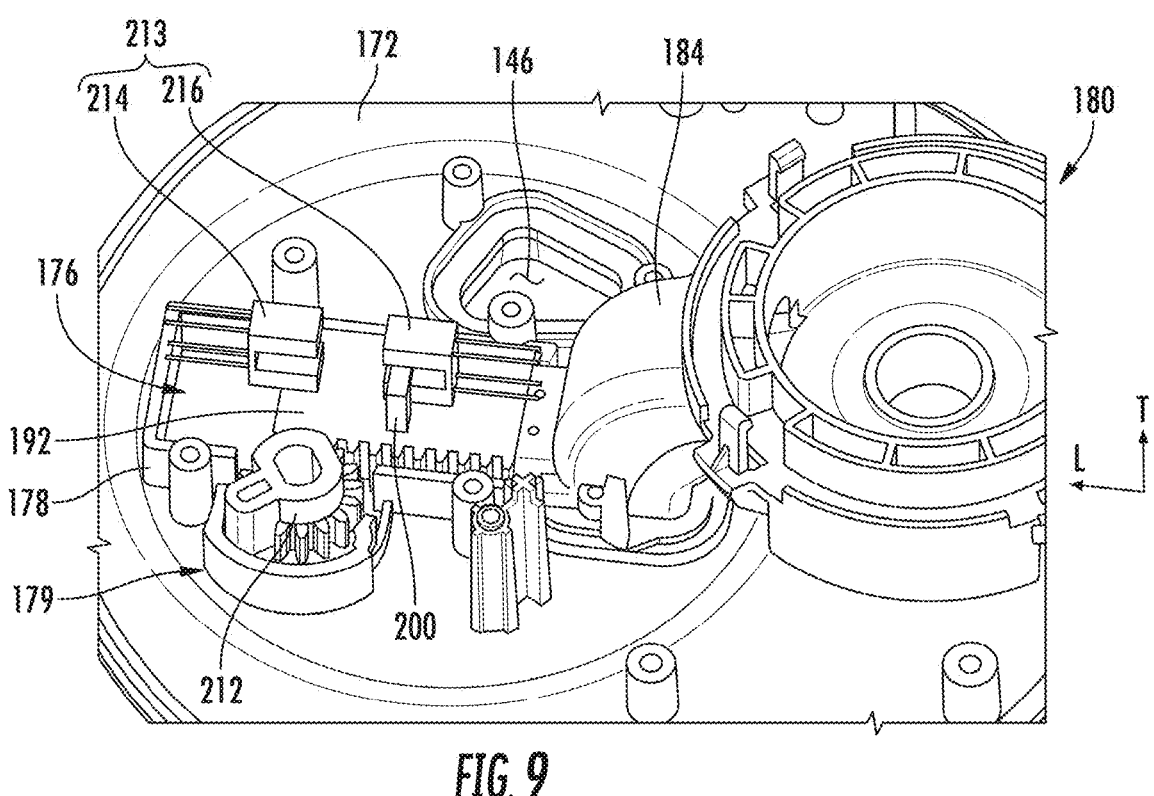
FIG. 9 provides a close-up perspective view of components of the exemplary beverage feeder system of FIG. 5 in a closed position.
Figure 10:
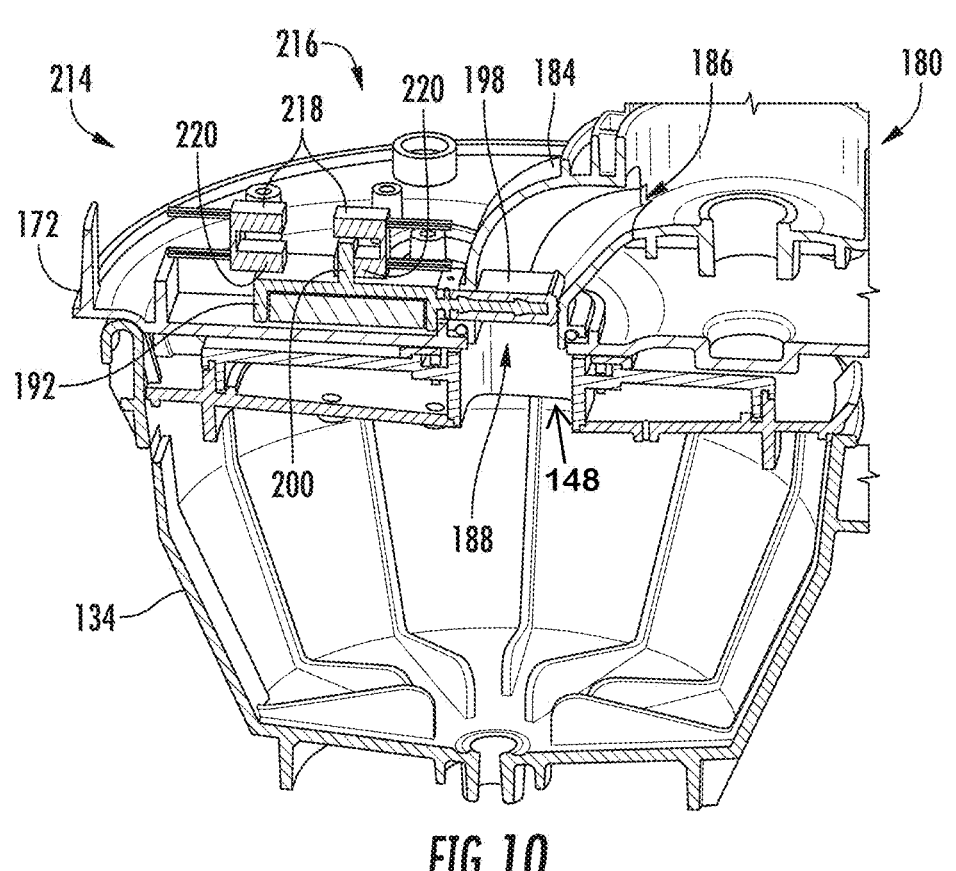
FIG. 10 provides a cross-section view of the components of the exemplary beverage feeder system of FIG. 5 in the closed position.

Driving gear 212 may include a plurality of gear teeth. For instance, driving gear 212 may be operably meshed with rack gear 196 of partition plate 192. As seen in FIGS. 7 and 9, driving gear 212 may interact with rack gear 196 via the space between partition groove 176 and gear groove 179. Accordingly, upon receiving the rotational input from motor 210, driving gear 212 may rotate about the circumferential direction C. Because driving gear 212 is meshed with rack gear 196, partition plate 192 may be linearly translated within partition groove 176 (e.g., from the first position to the second position, or vice versa). Advantageously, chute 184 may be opened or closed according to a position of partition plate 192 via the rotation of driving gear 212.

Beverage feeder system 170 may include a switch assembly 213. For instance, switch assembly 213 may include a first switch 214 and a second switch 216. First switch 214 and second switch 216 may be spaced apart from each other along the lateral direction L, for example. Switch assembly 213 may be provided above partition groove 176. In detail, switch assembly 213 may be accommodated within receiving space 208 of motor bracket 206. Additionally or alternatively, switch assembly 213 may be operably connected with controller 166. Accordingly, controller 166 may selectively operate motor 210 based on inputs received from each of first switch 214 and second switch 216.

First switch 214 may be provided distal to, e.g., chute 184 (along the lateral direction L). Second switch 216 may thus be located proximate to chute 184. First switch 214 and second switch 216 may be spaced apart along the lateral direction L, parallel with the extension direction of partition plate 192 (e.g., parallel with partition plate length 192L). According to at least one embodiment, as shown in FIGS. 7 through 10 for example, each of first switch 214 and second switch 216 are optical sensors or switches. In detail, each of first switch 214 and second switch 216 may be configured to interact with pin 200. First switch 214 and second switch 216 may be infrared sensors. For example, first switch 214 and second switch 216 may each include an emitter 218 and a receiver 220.

First switch 214 may be activated when pin 220 (e.g., second segment 204) is disposed between emitter 218 and receiver 220, thus interrupting the optical signal. For instance, when motor 210 is activated, driving gear 212 may be rotated (e.g., in a counterclockwise direction) to interact with rack gear 196 to slide partition plate 192 along the lateral direction L (e.g., away from chute 184). Pin 220 may thus move between emitter 218 and receiver 220 of first switch 214 when partition plate 192 is moved into the first position. Upon interrupting the optical signal in first switch 214, controller 166 may halt an operation of motor 210 to stop the sliding motion of partition plate 192.

Similarly, controller 166 may determine that the beverage powder has been fully supplied to basket 134 (e.g., when a grinding process by grinding mechanism 154 has been completed). Controller 166 may then activate motor 210 to rotate driving gear 212 (e.g., in a clockwise direction). Driving gear 212 may again interact with rack gear 196 to slide partition plate 192 along the lateral direction L (e.g., toward chute 184). Pin 220 may thus move between emitter 218 and receiver 220 of second switch 216 when partition plate 192 is moved into the second position. Upon interrupting the optical signal in second switch 214, controller 166 may halt the operation of motor 210 to stop the sliding motion of partition plate 192. Advantageously, the beverage powder supply pathway within chute 184 may be selectively opened and closed according to inputs for brewing operations. In particular, when partition plate 192 is in the second position (e.g., chute 184 is closed), steam and other brewing byproducts may be prevented from flowing up through chute 184 and into grinding mechanism 154 or hopper 150.

Figure 11:
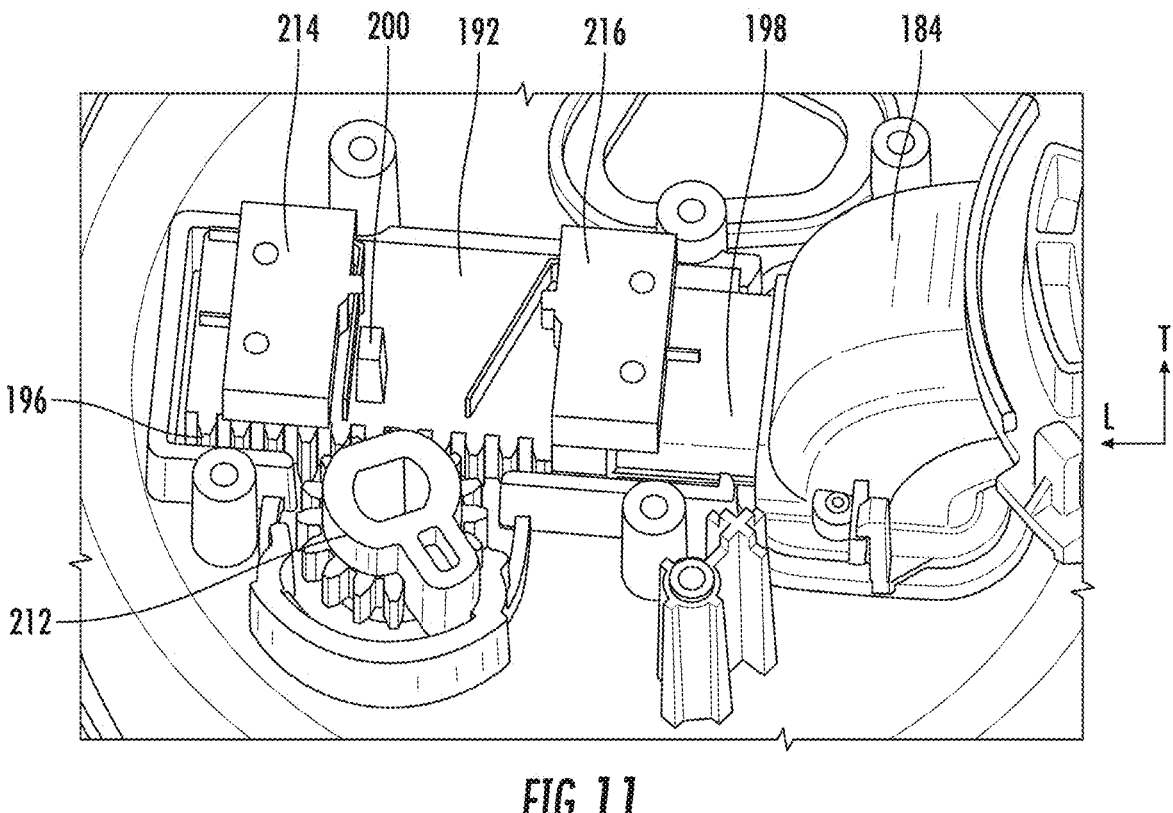
FIG. 11 provides a perspective view of a beverage feeder system according to another exemplary embodiment of the present disclosure.

Referring briefly to FIG. 11, another embodiment of the present disclosure is provided. For instance, according to FIG. 11, each of first switch 214 and second switch 216 may be mechanical switches. For instance, each of first switch 214 and second switch 216 may be any suitable switch capable of receiving a mechanical input and emitting a signal corresponding to the mechanical input, such as a reed switch, a contact switch, or the like. Each of first switch 214 and second switch 216 may be a single throw normally open contact switch, for example. Accordingly, switch assembly 213 may communicate with controller 166 upon activation or contact. Further, it should be understood that any suitable switch or sensor may be used for first switch 214 and second switch 216, and the disclosure is not limited to the examples given herein.

Similar to the embodiment described above, first switch 214 may be activated when pin 220 (e.g., first segment 202) contacts a portion of first switch 214. For instance, when motor 210 is activated, driving gear 212 may be rotated (e.g., in a counterclockwise direction) to interact with rack gear 196 to slide partition plate 192 along the lateral direction L (e.g., away from chute 184). Pin 220 may thus approach and contact first switch 214 when partition plate 192 is moved into the first position. Upon contacting first switch 214, controller 166 may halt an operation of motor 210 to stop the sliding motion of partition plate 192.

Similarly, controller 166 may determine that the beverage powder has been fully supplied to basket 134 (e.g., when a grinding process by grinding mechanism 154 has been completed). Controller 166 may then activate motor 210 to rotate driving gear 212 (e.g., in a clockwise direction). Driving gear 212 may again interact with rack gear 196 to slide partition plate 192 along the lateral direction L (e.g., toward chute 184). Pin 220 may thus approach and contact second switch 216 when partition plate 192 is moved into the second position. Upon contacting second switch 214, controller 166 may halt the operation of motor 210 to stop the sliding motion of partition plate 192. Advantageously, the beverage powder supply pathway within chute 184 may be selectively opened and closed according to inputs for brewing operations. In particular, when partition plate 192 is in the second position (e.g., chute 184 is closed), steam and other brewing byproducts may be prevented from flowing up through chute 184 and into grinding mechanism 154 or hopper 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A feeder system for a beverage dispenser, the feeder system defining an axial direction and a radial direction, the feeder system comprising:

a lid for a basket, the lid defining a chute aperture;

a mounting plate positioned over the lid, the mounting plate defining a mounting aperture, the mounting aperture being aligned with the chute aperture along the axial direction;

a feeder module comprising a chute, the chute defining an outlet aligned with the mounting aperture along the axial direction;

a partition plate slidably coupled to the mounting plate, the partition plate movable between a first position and a second position, wherein the partition plate comprises a rack gear, an extension tab selectively disposed across the chute aperture to close the chute, and a pin protruding along the axial direction from the rack gear;

a motor attached to the mounting plate;

a driving gear operably connected with the motor, wherein the driving gear is meshed with the rack gear of the partition plate; and a switch assembly comprising a first switch attached to the mounting plate at a first position and a second switch attached to the mounting plate at a second position different from the first position, wherein the pin is positioned between the first and second switches along the radial direction.

2. The feeder system of claim 1, wherein the chute comprises a partition aperture formed along the radial direction, the partition aperture selectively receiving the extension tab therein.

3. The feeder system of claim 1, wherein the first and second switches are optical infrared sensors configured to detect a position of the pin.

4. The feeder system of claim 1, wherein the first and second switches are contact switches configured to detect a position of the pin.

5. The feeder system of claim 1, further comprising:

a controller operably connected with the motor, the first switch, and the second switch, wherein the controller is configured to direct the motor in response to one or more discrete inputs from the switch assembly.

6. A beverage brewing system defining a vertical direction, a lateral direction, and a transverse direction, the beverage brewing system comprising:

a housing;

a component tower extending from the housing;

a brewing basket module removably accommodated within the component tower;

a hopper positioned within the component tower;

a controller provided within the housing; and a feeder system provided within the component tower, the feeder system comprising:

a lid for a basket, the lid defining a chute aperture;

a mounting plate positioned over the lid, the mounting plate defining a mounting aperture, the mounting aperture being aligned with the chute aperture along the vertical direction;

a feeder module comprising a chute, the chute defining an outlet aligned with the mounting aperture along the vertical direction;

a partition plate slidably coupled to the mounting plate, the partition plate movable between a first position and a second position, wherein the partition plate comprises a rack gear, an extension tab selectively disposed across the chute aperture to close the chute, and a pin protruding along the vertical direction from the rack gear;

a motor bracket attached to the mounting plate;

a motor attached to the motor bracket;

a driving gear operably connected with the motor, wherein the driving gear is meshed with the rack gear of the partition plate; and a switch assembly comprising a first switch attached to the motor bracket at a first position and a second switch attached to the motor bracket at a second position different from the first position, wherein the pin is positioned between the first and second switches along the lateral direction.

7. The beverage brewing system of claim 6, wherein the chute comprises a partition aperture formed along the lateral direction, the partition aperture selectively receiving the extension tab therein.

8. The beverage brewing system of claim 6, wherein the first and second switches are optical sensors configured to detect a position of the pin.

9. The beverage brewing system of claim 6, wherein the first and second switches are contact switches configured to detect a position of the pin.

10. The beverage brewing system of claim 6, wherein the controller is configured to direct the motor in response to one or more discrete inputs from the switch assembly.

11. The beverage brewing system of claim 6, further comprising:

a control panel provided on the housing;

a water tank selectively attached to the housing via a water tank mounting base; and a grinding mechanism provided within the component tower and operably coupled with the controller, the grinding mechanism being positioned between the hopper and the feeder module.

12. The beverage brewing system of claim 11, wherein controller is configured to perform a series of operations, the series of operations comprising:

receiving an input via the control panel to initiate a brewing operation;

activating the motor to slide the partition plate from the first position to the second position;

receiving a first stop signal from the first switch; and stopping the motor in response to receiving the first stop signal.

13. The beverage brewing system of claim 12, wherein the series of operations further comprises:

activating the grinding mechanism to perform a grinding operation in response to stopping the motor;

determining that the grinding operation has completed; and activating the motor to slide the partition plate from the second position to the first position.

14. The beverage brewing system of claim 13, wherein the series of operations further comprises:

receiving a second stop signal from the second switch; and stopping the motor in response to receiving the second stop signal.

\* \* \* \* \*